(12) United States Patent
Wermuth et al.

(10) Patent No.: US 8,616,182 B2
(45) Date of Patent: Dec. 31, 2013

(54) METHOD AND APPARATUS FOR CONTROLLING AN INTERNAL COMBUSTION ENGINE COUPLED TO A PASSIVE SELECTIVE CATALYTIC REDUCTION AFTERTREATMENT SYSTEM

(75) Inventors: Nicole Wermuth, Garching Bei München (DE); Paul M. Najt, Bloomfield Hills, MI (US); Kushal Narayanaswamy, Sterling Heights, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 308 days.

(21) Appl. No.: 13/098,606

(22) Filed: May 2, 2011

(65) Prior Publication Data
US 2011/0288750 A1 Nov. 24, 2011

Related U.S. Application Data

(60) Provisional application No. 61/347,801, filed on May 24, 2010.

(51) Int. Cl.
*F02D 41/14* (2006.01)
(52) U.S. Cl.
USPC ...... 123/436; 123/90.15; 123/443; 123/406.5
(58) Field of Classification Search
USPC ............ 123/295, 305, 90.15, 406.46, 406.47, 123/406.5, 436, 443; 701/103–105, 110
See application file for complete search history.

(56) References Cited

U.S. PATENT DOCUMENTS

| | | | |
|---|---|---|---|
| 7,128,047 B2 | 10/2006 | Kuo et al. | |
| 7,152,559 B2 | 12/2006 | Kuo et al. | |
| 7,228,839 B2 | 6/2007 | Kuo et al. | |
| 7,367,308 B2 | 5/2008 | Kuo et al. | |
| 7,370,616 B2 * | 5/2008 | Kuo et al. | 123/90.15 |
| 7,370,633 B2 | 5/2008 | Kang et al. | |
| 7,409,285 B2 | 8/2008 | Kang et al. | |
| 7,802,553 B2 | 9/2010 | Najt et al. | |
| 2006/0196466 A1 | 9/2006 | Kuo et al. | |
| 2006/0243241 A1 | 11/2006 | Kuo et al. | |
| 2010/0107605 A1 | 5/2010 | Brinkman et al. | |
| 2011/0283971 A1 * | 11/2011 | Wermuth et al. | 123/406.11 |
| 2011/0283972 A1 * | 11/2011 | Wermuth et al. | 123/406.12 |

* cited by examiner

*Primary Examiner* — Hai Huynh

(57) ABSTRACT

A direct-injection internal combustion engine is fluidly coupled to a passive SCR system including a three-way catalytic converter upstream to an ammonia-selective catalytic reduction catalyst. Transition from an HCCI combustion mode to an SI combustion mode includes determining a preferred air/fuel ratio to achieve a minimum fuel consumption and maintain combustion stability at an acceptable level for a predetermined engine operating point during the SI combustion mode. A fuel injection timing, an engine spark timing and an engine valve lift are substantially immediately controlled from respective HCCI combustion mode settings to respective SI combustion mode settings. A transition to the preferred air/fuel ratio is coordinated with a transition of an engine valve phase from a respective HCCI combustion mode setting to a respective SI combustion mode phase setting.

12 Claims, 4 Drawing Sheets

METHOD AND APPARATUS FOR CONTROLLING AN INTERNAL COMBUSTION ENGINE COUPLED TO A PASSIVE SELECTIVE CATALYTIC REDUCTION AFTERTREATMENT SYSTEM

CROSS REFERENCE TO RELATED APPLICATIONS

This application claims the benefit of U.S. Provisional Application No. 61/347,801, filed on May 24, 2010, which is incorporated herein by reference.

TECHNICAL FIELD

This disclosure relates to an internal combustion engine configured to operate in two discrete combustion modes and exhaust aftertreatment systems.

BACKGROUND

The statements in this section merely provide background information related to the present disclosure and may not constitute prior art.

Known spark-ignition (SI) engines introduce an air/fuel mixture into each cylinder that is compressed in a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in a variety of different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. The HCCI combustion mode includes a distributed, flameless, auto-ignition combustion process that is controlled by oxidation chemistry. An engine operating in the HCCI combustion mode has a cylinder charge that is preferably homogeneous in composition, temperature, and residual exhaust gases at intake valve closing time. HCCI combustion is a distributed kinetically-controlled combustion process with the engine operating at a dilute air/fuel mixture, i.e., lean of a stoichiometric air/fuel point, with relatively low peak combustion temperatures, resulting in low NOx emissions. The homogeneous air/fuel mixture minimizes occurrences of rich in-cylinder combustion zones that form smoke and particulate emissions.

Engine airflow may be controlled by selectively adjusting position of the throttle valve and openings and closings of intake and exhaust valves. On engine systems so equipped, openings and closings of the intake and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

When an engine operates in a HCCI combustion mode, the engine operates at a lean or stoichiometric air/fuel ratio with the throttle wide open to minimize engine pumping losses. When the engine operates in the SI combustion mode, the engine operates in stoichiometric air/fuel ratio, with the throttle valve controlled over a range of positions from 0% to 100% of the wide-open position to control intake airflow to achieve the stoichiometric air/fuel ratio.

In an engine configured to operate in SI and HCCI combustion modes, transitioning between combustion modes may be complex. The engine control module must coordinate activations of multiple devices in order to provide a desired air/fuel ratio for the different modes. During a transition between a HCCI combustion mode and SI combustion mode, valve lift switching occurs nearly instantaneously, while adjustments to cam phasers and pressures in the manifold have slower dynamics. Until the desired air/fuel ratio is achieved, incomplete combustion and misfire may occur, leading to torque disturbances.

Timing of auto-ignition combustion during engine operation in the HCCI combustion mode is affected by cylinder charge gas temperature before and during compression prior to ignition and by mixture composition of a cylinder charge. A desired auto-ignition timing associated with maximum efficiency is achieved by accounting for all influencing parameters affecting the cylinder charge gas temperature.

Known engines operating in auto-ignition combustion modes account for operating conditions using calibration tables as part of an overall engine control scheme executed in an engine control module. Known HCCI engine control schemes include calibrations for controlling engine parameters based on a limited number of input parameters including, e.g., engine load, engine speed and engine coolant temperature. Measured output parameters are used to control (among others) the amount of hot residuals (via variable cam phasing) and the amount of cold residuals (via exhaust gas recirculation rate) and therefore control in-cylinder gas temperature.

Known control systems use feedback control algorithms to compensate for effects of environmental and ambient parameters on ignition timing and air/fuel ratio. Complex multidimensional calibration tables may be used to account for all influencing parameters.

Known engines operating in HCCI combustion mode at mid-range load conditions may add fuel late in a combustion cycle to provide additional hydrocarbons in an exhaust gas feedstream to generate ammonia for NOx reduction, thus consuming fuel without a corresponding torque benefit.

Known aftertreatment systems for engines configured for operating in HCCI combustion modes may have active injection systems for dosing urea or other reductants into the exhaust gas feedstream for selective catalyst reduction.

During engine refiring subsequent to a fuel cutoff event, known engines operate at stoichiometry or rich of stoichiometry to consume oxygen stored in a three-way catalytic converter and prevent NOx breakthrough associated with lean engine operation, thus consuming fuel without a corresponding torque benefit.

SUMMARY

A direct-injection internal combustion engine is fluidly coupled to a passive SCR system including a three-way catalytic converter upstream to an ammonia-selective catalytic reduction catalyst. Transition from an HCCI combustion mode to an SI combustion mode includes determining a preferred air/fuel ratio to achieve a minimum fuel consumption and maintain combustion stability at an acceptable level for a predetermined engine operating point during the SI combustion mode. A fuel injection timing, an engine spark timing and an engine valve lift are substantially immediately controlled from respective HCCI combustion mode settings to respective SI combustion mode settings. A transition to the preferred air/fuel ratio is coordinated with a transition of an engine valve phase from a respective HCCI combustion mode setting to a respective SI combustion mode phase setting.

BRIEF DESCRIPTION OF THE DRAWINGS

One or more embodiments will now be described, by way of example, with reference to the accompanying drawings, in which.

DETAILED DESCRIPTION

Figure 1:
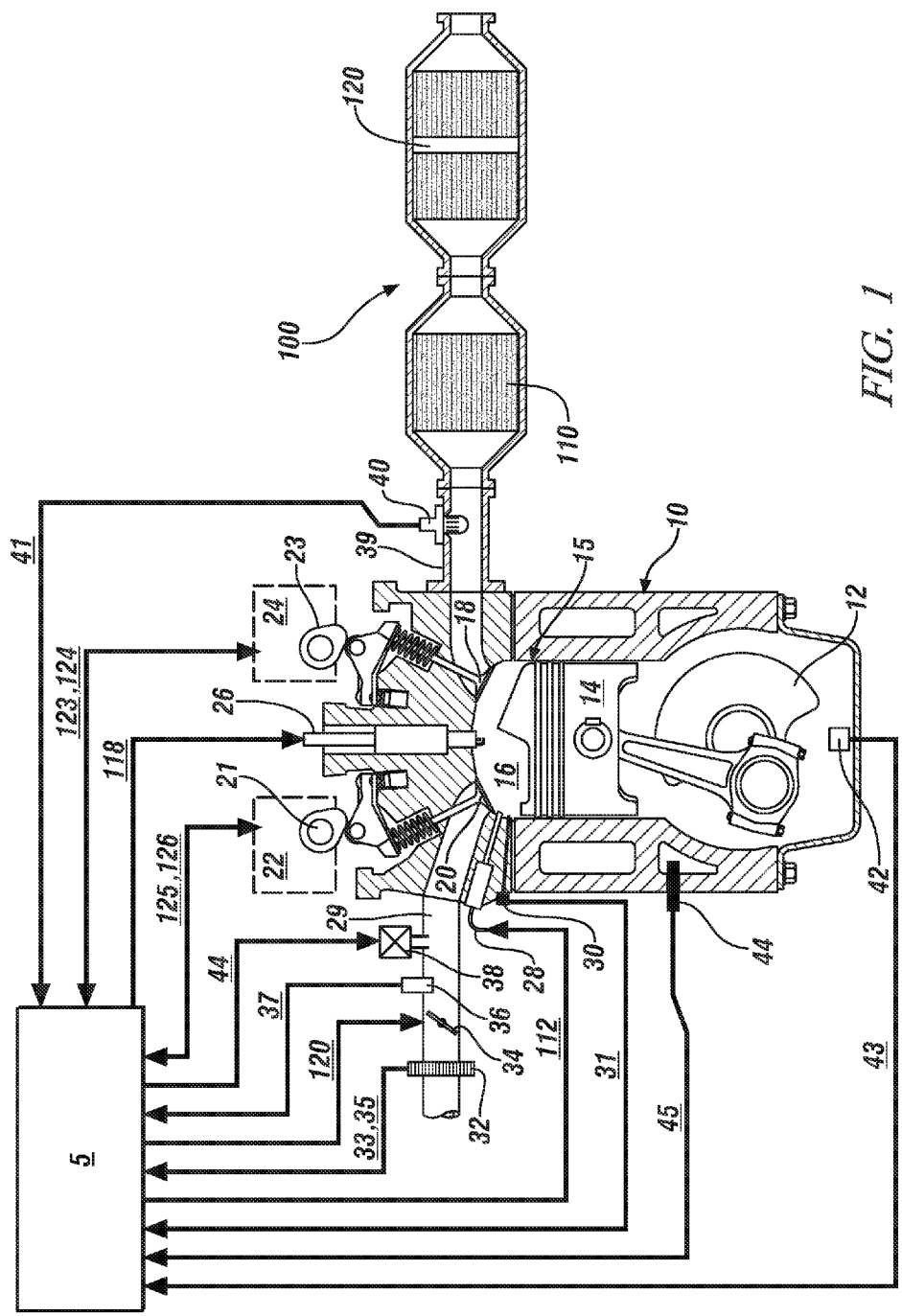
FIG. 1 is a schematic drawing of a spark-ignition internal combustion engine, a passive-SCR exhaust aftertreatment system, and an accompanying control module in accordance with the present disclosure.

Referring now to the drawings, wherein the depictions are for the purpose of illustrating certain exemplary embodiments only and not for the purpose of limiting the same, FIG. 1 is a schematic drawing of an internal combustion engine 10 fluidly coupled to a passive-SCR exhaust aftertreatment system 100 with an accompanying control module 5 that have been constructed in accordance with an embodiment of this disclosure. The exemplary engine 10 is configured to operate in one of a plurality of combustion modes preferably including a homogeneous-charge compression-ignition (HCCI) combustion mode and a spark-ignition (SI) combustion mode. The engine 10 may be controlled to operate at a stoichiometric air/fuel ratio and at an air/fuel ratio that is primarily lean of stoichiometry. The disclosure may be applied to various internal combustion engine systems and combustion cycles.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system has airflow ductwork and devices for monitoring and controlling the air flow. The air intake devices preferably include a mass airflow sensor 32 for monitoring mass airflow (MAF) 33 and intake air temperature (IAT) 35. A throttle valve 34 preferably includes an electronically controlled device that is used to control airflow to the engine 10 in response to a control signal 120 from the control module 5. A pressure sensor 36 in the intake manifold 29 is configured to monitor manifold absolute pressure (MAP) 37 and barometric pressure. An external flow passage recirculates exhaust gases from engine exhaust to the intake manifold 29, having a flow control valve referred to as an exhaust gas recirculation (EGR) valve 38. The control module 5 controls mass flow of exhaust gas to the intake manifold 29 by controlling opening of the EGR valve 38 via control signal 44.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 may be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The intake VCP/VLC device 22 preferably includes a mechanism operative to switch and control valve lift (VLC) of the intake valve(s) 20 in response to a control signal 125 and variably adjust and control phasing (VCP) of the intake camshaft 21 for each cylinder 15 in response to a control signal 126. The exhaust VCP/VLC device 24 preferably includes a controllable mechanism operative to variably switch and control valve lift (VLC) of the exhaust valve(s) 18 in response to a control signal 123 and variably adjust and control phasing (VCP) of the exhaust camshaft 23 for each cylinder 15 in response to a control signal 124.

The intake and exhaust VCP/VLC devices 22 and 24 each preferably includes a controllable two-step VLC mechanism operative to 20 and 18, respectively, to one of two discrete steps. The two discrete steps preferably include a low-lift valve open position (about 4-6 mm in one embodiment) preferably for low speed, low load operation, and a high-lift valve open position (about 8-13 mm in one embodiment) preferably for high speed and high load operation. The intake and exhaust VCP/VLC devices 22 and 24 each preferably includes a variable cam phasing (VCP) mechanism to control and adjust phasing (i.e., relative timing) of opening and closing of the intake valve(s) 20 and the exhaust valve(s) 18 respectively. Adjusting phasing refers to shifting opening times of the intake and exhaust valve(s) 20 and 18 relative to positions of the crankshaft 12 and the piston 14 in the respective cylinder 15. The VCP mechanisms of the intake and exhaust VCP/VLC devices 22 and 24 each preferably has a range of phasing authority of about 60°-90° of crank rotation, thus permitting the control module 5 to advance or retard opening and closing of one of intake and exhaust valve(s) 20 and 18 relative to position of the piston 14 for each cylinder 15. The range of phasing authority is defined and limited by the intake and exhaust VCP/VLC devices 22 and 24. The intake and exhaust VCP/VLC devices 22 and 24 include camshaft position sensors to determine rotational positions of the intake and the exhaust camshafts 21 and 23. The VCP/VLC devices 22 and 24 are actuated using one of electro-hydraulic, hydraulic, and electric control force, in response to the respective control signals 123, 124, 125, and 126.

The engine 10 employs a direct-injection fuel injection system including a plurality of high-pressure fuel injectors 28 that are configured to directly inject a mass of fuel into one of the combustion chambers 16 in response to a control signal (INJ_PW) 112 from the control module 5. It is appreciated that the control signal INJ_PW 112 includes a pulsewidth duration, in elapsed time, and start of injection relative to TDC. The fuel injectors 28 are supplied pressurized fuel from a fuel distribution system. Injection timing as used in this disclosure includes duration and start of injection for single and split injection schemes as may be employed in various combustion modes.

The engine 10 includes a spark-ignition system by which spark energy may be provided to a spark plug 26 for igniting or assisting in igniting cylinder charges in each of the combustion chambers 16 in response to a control signal (IGN) 118 from the control module 5.

The engine 10 is equipped with various sensing devices for monitoring engine operation, including a crank sensor 42 having output RPM 43 indicative of crankshaft rotational position, i.e., crank angle and speed. A temperature sensor 44 is configured to monitor coolant temperature 45. An in-cylinder combustion sensor 30 is configured to monitor combustion 31. The in-cylinder combustion sensor 30 is configured to monitor combustion and includes a cylinder pressure sensor operative to monitor in-cylinder combustion pressure 31 in one embodiment. An exhaust gas sensor 40 is configured to monitor an exhaust gas parameter 41, e.g., air/fuel ratio (AFR). The combustion pressure 31 and the RPM 43 are monitored by the control module 5 to determine combustion phasing, i.e., timing of combustion pressure relative to the crank angle of the crankshaft 12 for each cylinder 15 for each combustion cycle. It is appreciated that combustion phasing may be determined by other methods. The combustion pressure 31 may be monitored by the control module 5 to determine an indicated mean effective pressure (IMEP) for each cylinder 15 for each combustion cycle. Preferably, the engine 10 and control module 5 are configured to monitor and determine states of IMEP for each of the engine cylinders 15 during each cylinder firing event.

The passive-SCR exhaust aftertreatment system 100 fluidly couples to the exhaust manifold 39 of the engine 10 and operates to convert engine exhaust gas constituents to inert gases. The passive-SCR exhaust aftertreatment system 100 includes a three-way catalytic converter (TWC) 110 positioned fluidly upstream of an ammonia-selective catalytic reduction catalyst (SCR) 120. The passive-SCR exhaust aftertreatment system 100 is considered passive because all reductants employed to effect NOx reduction in the SCR 120 originate from fuel injected into the combustion chamber during engine operation, and there is no external infusion of urea, fuel or other substances into the exhaust gas feedstream upstream of either the TWC 110 or the SCR 120. The passive-SCR exhaust aftertreatment system 100 is equipped with one or more sensors suitable for monitoring one or more exhaust gas constituents and determining a state of a mass flow concentration or other parameters in the exhaust gas feedstream upstream of the TWC 110, between the TWC 110 and SCR 120, and downstream of the SCR 120 for purposes of engine control and diagnostics. The control module 5 monitors inputs from the aforementioned sensors to determine states of engine parameters.

Exhaust gas constituents in the engine-out exhaust gas feedstream may include hydrocarbons (HC), carbon monoxide (CO), water ($H_2O$), and nitrogen oxides (NOx). During ongoing operation, the TWC 110 converts some of the exhaust gas constituents to inert gases. During engine operation at a rich air/fuel ratio, the TWC 110 may convert HC and CO to carbon dioxide ($CO_2$), $H_2O$, and ammonia ($NH_3$). The $NH_3$ may be stored on the SCR 120. During subsequent engine operation at a lean air/fuel ratio the TWC 110 may convert a portion of the exhaust gas feedstream to $CO_2$ and $H_2O$, and may reduce the NOx using $O_2$ that is stored on the TWC 110. The SCR 120 utilizes the stored $NH_3$ as a reductant to reduce NOx in the exhaust gas feedstream into other molecules such as diatomic nitrogen ($N_2$) and $H_2O$. These gas reactions are known.

The control module 5 is configured to receive input signals from an operator (e.g., via an accelerator pedal and a brake pedal) to determine an operator torque request, from which an engine torque command is derived. The control module 5 executes algorithmic code stored therein to control the aforementioned actuators to form a cylinder charge to generate power in response to the engine torque command, including controlling throttle position, spark-ignition timing, fuel injection mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO).

The control module 5 is configured to execute an engine fuel cutoff (FCO) event. AN FCO event may be executed when an operator removes their foot from an accelerator pedal, resulting in vehicle coasting. In response, the engine may still continue to spin, but engine fueling is cutoff to reduce fuel consumption. When the operator subsequently applies pressure to the accelerator pedal, engine fueling is restored, and the engine fires and generates torque.

The control module 5 may control the engine 10 using autostart and autostop control schemes during ongoing vehicle operation, and may operate to selectively deactivate a portion of the combustion chambers 15 or a portion of the intake and exhaust valves 20 and 18 through control of fuel and spark and valve deactivation. The control module 5 may control air/fuel ratio based upon feedback from the exhaust gas sensor 40. The control module 5 may control the engine 10 by commanding an FCO event, e.g., during a vehicle deceleration event, and subsequently fueling the engine 10 for refiring.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinatorial logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

For purposes of the present disclosure, an engine control scheme includes a combustion mode and an air/fuel ratio. For purposes of the present disclosure, a combustion mode includes control or settings for fuel injection timing, spark timing, and engine valves (including lift and phase). Operation of the engine 10 in the HCCI combustion mode preferably includes appropriate settings for injection timing and spark timing (for example spark assist), intake/exhaust valve NVO, and low intake/exhaust valve lift. Throttle valve 34 is preferably in a substantially wide-open (WOT) position (fully un-throttled, or slightly throttled to create a vacuum in the intake manifold 29 to effect EGR flow), and a lean or stoichiometric air/fuel ratio is established. In one embodiment, in-cylinder EGR mass is controlled to a high dilution rate, e.g., greater than 40% of cylinder air charge. Operation of the engine 10 in the homogeneous spark-ignition combustion (SI) mode preferably includes appropriate settings for injection timing and spark timing, intake/exhaust valve PVO, and high intake/exhaust valve lift. Preferably, the throttle valve 34 regulates the air flow in response to an operator torque request, a lean or a stoichiometric air/fuel ratio is established. Fuel injection timing is preferably during an intake or compression stroke of an engine cycle before TDC. Spark timing is preferably discharged at a predetermined time subsequent to the fuel injection when a fuel/air charge within the cylinder is substantially homogeneous. Spark timing in the SI combustion mode is preferably controlled to a mean-best torque (MBT) spark timing at each engine operating point over the entire speed/load operating range. An MBT spark timing map may be developed for the entire speed/load operating range for an embodiment of the engine 10 using known engine mapping techniques.

Figure 2:
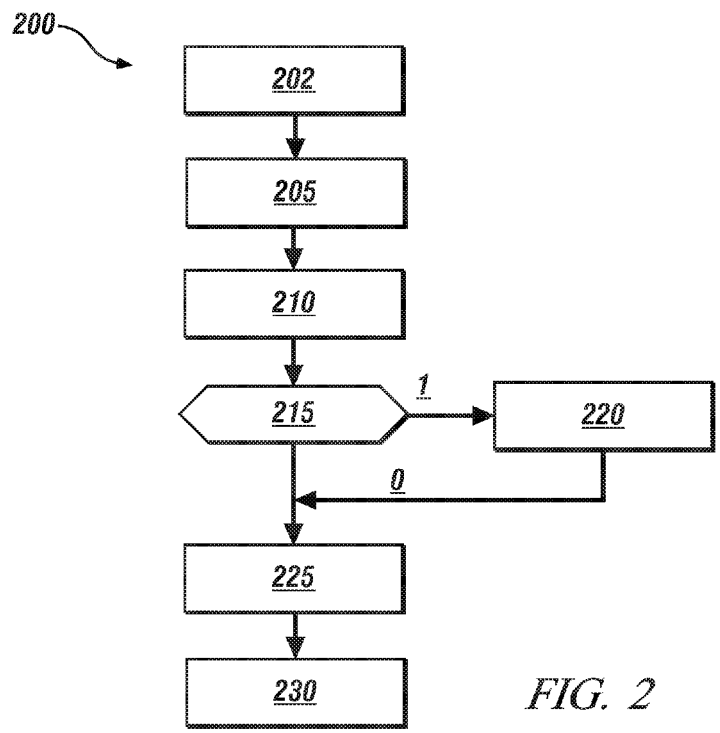
FIG. 2 is a flowchart for a passive selective catalytic reduction strategy that advantageously employs the engine and the passive-SCR exhaust aftertreatment system to effect NOx reduction in accordance with the disclosure.

FIG. 2 is a flowchart for executing a passive selective catalytic reduction engine control strategy (passive SCR strategy) 200 that advantageously controls operation of the engine 10 in response to the engine torque command while effecting emissions control including NOx reduction in the passive-SCR exhaust aftertreatment system 100. Table 1 is provided as a key wherein the numerically labeled blocks and the corresponding functions are set forth as follows.

TABLE 1

| BLOCK | FIG. 2 BLOCK CONTENTS |
|---|---|
| 202 | Execute passive SCR strategy |
| 205 | Monitor operator torque request and determine engine torque command |
| 210 | Select preferred engine control scheme |
| 215 | Is combustion mode transition required? |
| 220 | Execute combustion mode transition |
| 225 | Determine preferred fueling rate |
| 230 | Employ preferred engine control scheme to control engine at preferred fueling rate |

The control module 5 regularly and periodically executes algorithmic code embodying the passive SCR strategy 200 to operate the internal combustion engine 10 including the passive-SCR exhaust aftertreatment system 100 during each vehicle key-on event. Executing the passive SCR strategy 200 (202) includes determining an engine torque command (205). The engine torque command includes the operator torque request and other engine or powertrain system requirements, e.g., for providing mechanical power to pumps, electric motors, generators, etc. The engine torque command may include refiring the engine 10 subsequent to an FCO event.

A preferred engine control scheme for controlling operation of the engine 10 is selected or otherwise determined in response to the engine torque command (210). The preferred engine control scheme includes a selected combustion mode, i.e., one of the HCCI and the SI combustion modes, and a selected air/fuel ratio. The selected air/fuel ratio may be lean or stoichiometric, and is preferably selected for an engine operating point corresponding to the engine torque command. In one embodiment, selecting the preferred engine control scheme includes developing and implementing a table of preferred engine control schemes corresponding to a plurality of engine operating points over an entire speed/load operating range for the engine 10. As such, there is a preferred one of the HCCI and the SI combustion modes and a preferred air/fuel ratio associated with each engine operating point over an entire speed/load operating range for the engine 10 in one embodiment.

When an embodiment of the engine 10 operates using the preferred engine control scheme, it achieves minimum fuel consumption and maintains combustion stability at an acceptable level at the engine operating point corresponding to the engine torque command. Maintaining combustion stability at an acceptable level preferably includes achieving an acceptable magnitude of COV-IMEP or another parameter associated with combustion stability.

The control module 5 controls the engine 10 using the preferred engine control scheme selected by the passive SCR strategy 200 to minimize fuel consumption and maintain combustion stability. The passive SCR strategy 200 determines a preferred engine fueling rate, which is a minimum engine fueling rate necessary to achieve an engine operating point corresponding to the engine torque command at the preferred air/fuel ratio when employing the preferred engine control scheme to control the engine 10. Spark timing in the SI combustion mode is preferably controlled to the MBT spark timing at each engine operating point. Thus, the preferred engine control scheme is selected without regard for engine-out emissions.

The passive SCR strategy 200 for a specific engine application may include predetermining a plurality of preferred engine control schemes based upon engine operating parameters of combustion stability, fuel consumption, and engine torque output. Speed and load boundaries that define a preferred one of the combustion modes may be precalibrated and stored in the control module 5. A change in the engine torque command or in the engine operating point may effect a change in the preferred engine control scheme, i.e., may effect a change in one or both the preferred combustion mode and the preferred air/fuel ratio.

When the preferred engine control scheme is selected, it is determined whether a combustion mode transition is required (215). The control module 5 effects transitions to the preferred engine control scheme to increase fuel efficiency while maintaining the combustion stability at an acceptable level. When a combustion mode transition is required (1), the control module 5 executes a combustion mode transition to operate the engine 10 in the preferred combustion mode at the preferred air/fuel ratio to increase fuel efficiency and/or maintain the combustion stability at an acceptable level (220). A change in one of the engine parameters, e.g., speed and load, may cause a change in an engine operating zone. The control module 5 may then command a change in the preferred combustion mode in response to the change in the engine operating zone.

During a combustion mode transition, the engine 10 is controlled to operate at a preferred air/fuel ratio and the intake airflow and fuel injection are controlled to achieve the preferred air/fuel ratio associated with the selected combustion mode. This includes estimating a cylinder air charge based upon engine operation in the selected combustion mode. The throttle valve 34 and intake and exhaust VCP/VLC devices 22 and 24 are controlled to achieve an intake air flowrate based upon the estimated cylinder air charge, including during a transition between the SI and HCCI combustion modes. Airflow is controlled by adjusting the throttle valve 34 and the intake and exhaust VCP/VLC devices 22 and 24 to control the opening timing and profiles of the intake and exhaust valve(s) 20 and 18. Operations in the two combustion modes require different settings for the intake and exhaust VCP/VLC devices 22 and 24 in terms of valve timing and profiles of the intake and exhaust valve(s) 20 and 18 and the throttle valve 34 for throttle position.

During a transition from the SI combustion mode to the HCCI combustion mode, the engine 10 transitions to operate at a lean or stoichiometric air/fuel ratio including controlling airflow to achieve the preferred air/fuel ratio. The control module 5 commands the throttle 34 to open to a predetermined position and commands the intake and exhaust VCP/VLC systems 22 and 24 to adjust the intake and exhaust cam phasers to achieve NVO, thereby increasing manifold pressure. Airflow increases due to the increasing manifold pressure until the VLC portion of the intake and exhaust VCP/VLC systems 22 and 24 switches the intake and exhaust valves 20 and 18 from the high-lift valve open position to the low-lift valve open position.

Figure 5:
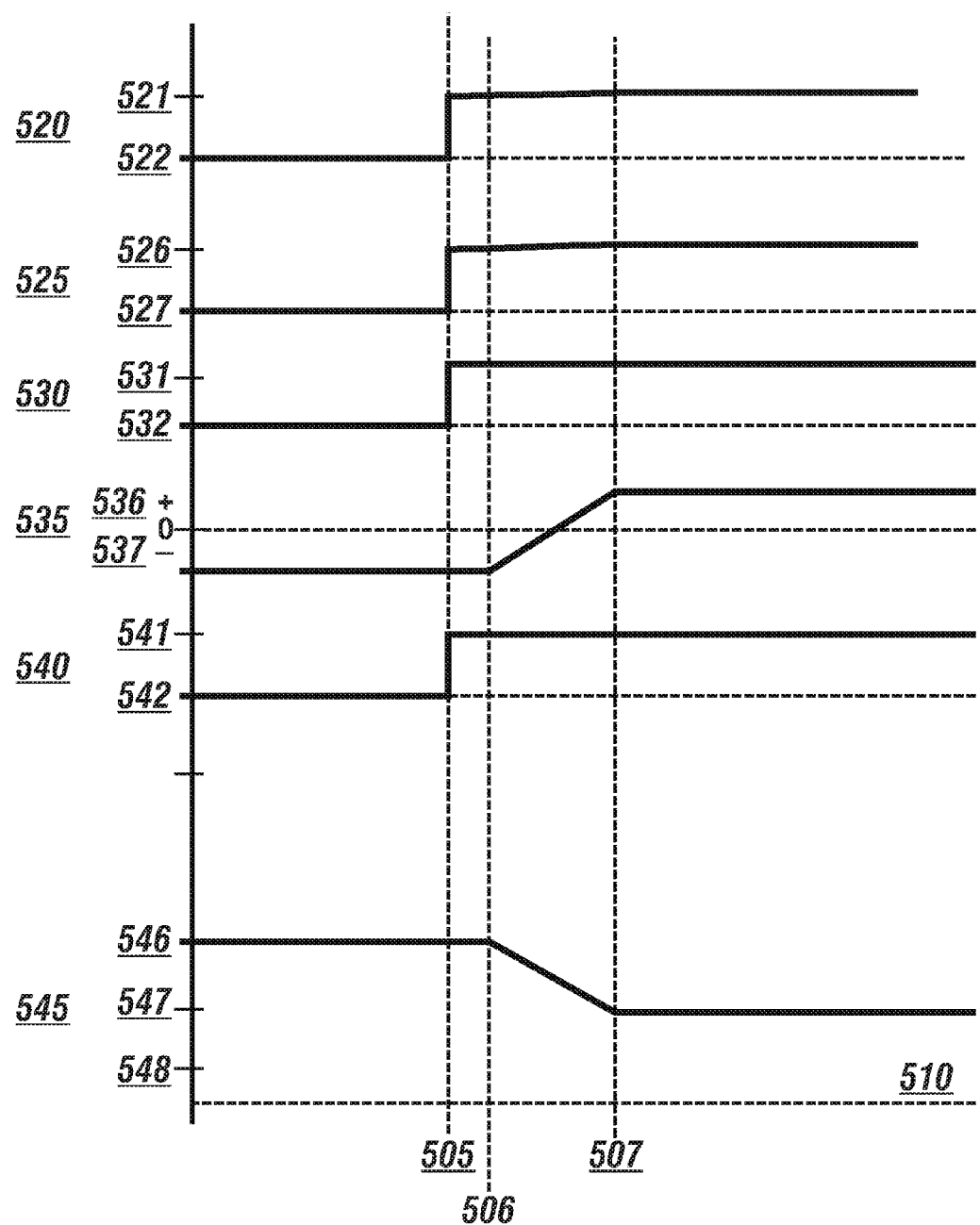
FIG. 5 graphically shows a plurality of engine operating and control parameters plotted over an elapsed period of time associated with the passive SCR strategy for an embodiment of the engine including the passive-SCR exhaust aftertreatment system associated with a transition between operating in an HCCI combustion mode and an SI combustion mode in accordance with the disclosure.

During a transition from the HCCI combustion mode to the SI combustion mode, the engine 10 transitions to operate at the stoichiometric air/fuel ratio. The control module 5 controls the throttle 34 to a predetermined position and commands the intake and exhaust VCP/VLC systems 22 and 24 to adjust the intake and exhaust cam phasers to PVO, which may result in a decrease in the manifold pressure while switching the intake and exhaust valves 20 and 18 from the low-lift valve open position to the high-lift valve open position and thereby increase cylinder airflow. FIG. 5 graphically depicts details associated with a preferred process for transitioning from the HCCI combustion mode to the SI combustion mode.

A preferred engine fueling rate is determined (225). The preferred engine fueling rate consists of, i.e., is limited to an engine fueling rate that is responsive to the engine torque command and maintains the combustion stability at an acceptable level when employing the preferred engine control scheme to control the engine 10. As such, the preferred engine fueling rate is a minimum engine fueling rate necessary to achieve an engine operating point corresponding to the engine torque command at the preferred air/fuel ratio when employing the preferred one of the HCCI combustion mode and the SI combustion mode to control the engine 10. This includes engine fueling subsequent to an FCO event that is responsive to an engine torque command that may include an operator torque request.

The preferred engine control scheme is employed to control the engine 10 at the preferred engine fueling rate in the selected one of the HCCI and the SI combustion modes and at the selected air/fuel ratio (230).

Engine operation is affected by the passive SCR strategy 200, including selecting preferred engine control schemes for operating the engine 10 in the HCCI combustion mode at lean air/fuel ratios when operating at mid-range engine loads without adding post-combustion fuel or reductant, operating the engine 10 during transitions from lean HCCI to stoichiometric HCCI operation, operating the engine 10 during transitions between the HCCI combustion mode and the SI combustion mode, and operating the engine 10 during engine re-firing subsequent to FCO.

Figure 3:
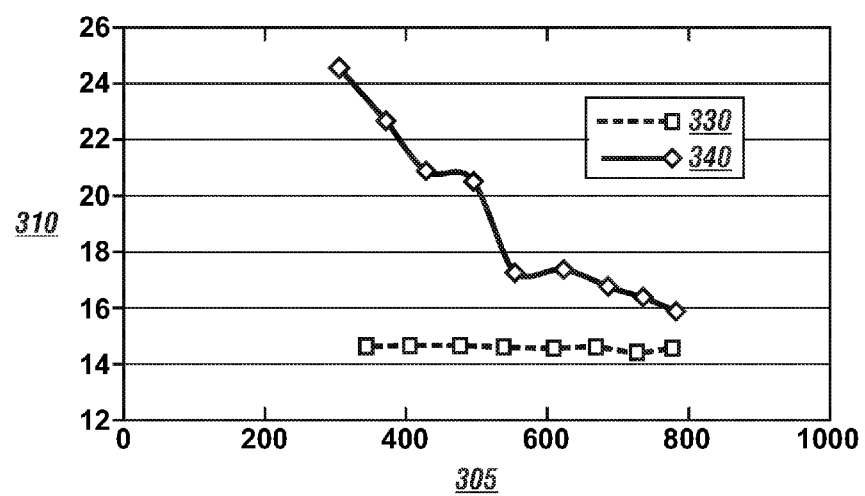
FIG. 3 graphically illustrates air/fuel ratio in relation to engine load when operating an embodiment of the engine at lean air/fuel ratios and stoichiometric air/fuel ratio when the engine is operating in the HCCI combustion mode in accordance with the disclosure.

FIG. 3 graphically illustrates air/fuel ratio (310) in relation to engine load (305), measured in NMEP (kPa), when operating an embodiment of the engine 10 at lean air/fuel ratios (340) and stoichiometric air/fuel ratio (330) when the exemplary engine 10 is operating in the HCCI combustion mode.

Figure 4:
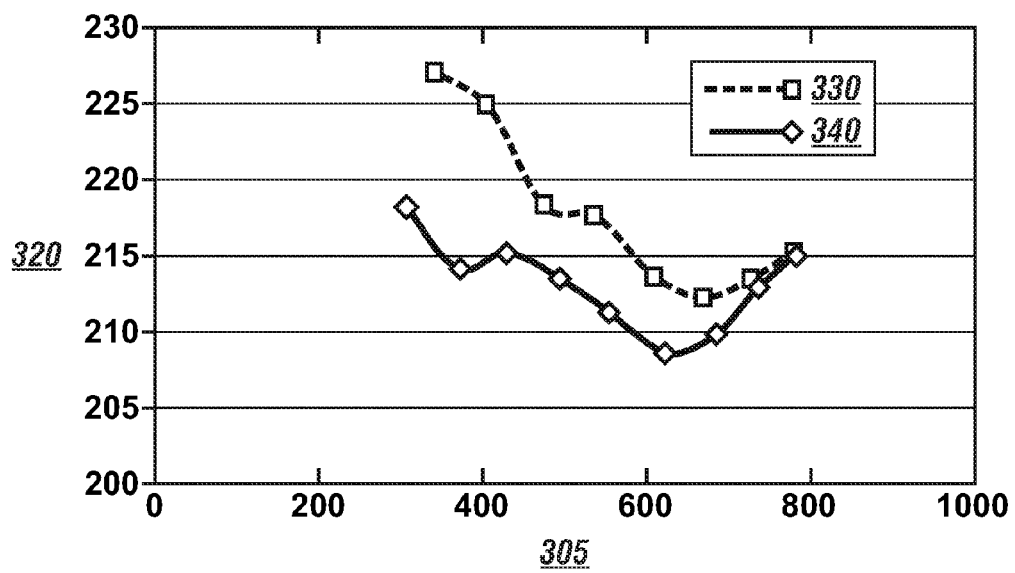
FIG. 4 graphically illustrates a corresponding net specific fuel consumption in relation to the engine load when operating the exemplary engine at lean air/fuel ratios and stoichiometric air/fuel ratio when the engine is operating in the HCCI combustion mode in accordance with the disclosure.

FIG. 4 graphically illustrates a net specific fuel consumption (gm/kW-h) (320) in relation to the engine load (305) when operating the exemplary engine 10 at lean air/fuel ratios (340) and stoichiometric air/fuel ratio (330) when the engine 10 is operating in the HCCI combustion mode. The results shown in FIGS. 3 and 4 illustrate that there are fuel consumption benefits associated with operating the engine 10 in the HCCI combustion mode with lean air/fuel ratios at mid-load operating conditions. The air/fuel ratio for the lean operation is significantly higher than for stoichiometric operation at low load and decreases with engine load due to a decreasing portion of a cylinder displacement volume that is available for charge dilution. A fuel economy benefit may be achieved with lean HCCI operation, with the most pronounced effect on fuel consumption and improvement in fuel economy being realized at low engine loads. The results also indicate that decreasing the air/fuel ratio reduces fuel economy benefits of operating lean in the HCCI combustion mode, with both the lean and the stoichiometric operating conditions achieving nearly the same fuel consumption at high load operation. Thus, employing lean HCCI combustion mode as part of executing the passive SCR strategy 200 allows for reduced fuel consumption while managing NOx emissions. Ammonia required for efficacious operation of the SCR 120 may be produced in the TWC 110 during vehicle acceleration events and during combustion mode transitions between HCCI and SI combustion modes.

The passive SCR strategy 200 may provide benefits during a transition between low-lift valve open positions and high-lift valve open positions. The preferred operating strategy during a transition from a low-lift valve open position to a high-lift valve open position includes sequentially operating with a lean or stoichiometric HCCI combustion mode, transitioning to a lean SI combustion mode, and subsequently transitioning to a stoichiometric SI combustion mode.

There may be a substantial difference in in-cylinder air mass between operation with a low-lift valve open position and operation with a high-lift valve open position, regardless of the cam phasing angle. Engine torque output may change significantly with a change between low-lift and high-lift valve open positions if the required fuel mass for a stoichiometric mixture is burned with maximum efficiency. Therefore, a transition between low-lift and high-lift valve open positions associated with the transition from HCCI combustion mode to the SI combustion mode preferably includes sequentially operating with a lean or stoichiometric HCCI combustion mode, transitioning to a lean SI combustion mode, and subsequently transitioning to a stoichiometric SI combustion mode. This transition strategy minimizes or eliminates torque disturbances and reduces or eliminates torque management strategies such as ignition timing control that consume fuel without generating torque during transitions. This transition is depicted with reference to FIG. 5.

FIG. 5 graphically depicts a portion of the passive SCR strategy 200 associated with a preferred process for transitioning the engine 10 including the passive-SCR exhaust aftertreatment system 100 from the HCCI combustion mode to the SI combustion mode. FIG. 5 includes a showing of a plurality of engine operating and control parameters plotted over an elapsed period of time (510). Engine operating parameters include fuel injection timing 520 including SI timing 521 and HCCI timing 522, spark ignition timing 525 including SI spark-ignition timing (i.e., MBT spark timing) 526 and HCCI supplemental spark timing 527, combustion modes 530 including the SI combustion mode 531 and the HCCI combustion mode 532, cam phasing (i.e., VCP) 535 including PVO 536 and NVO 537, valve lift (i.e., VLC) 540 including low-lift 542 and high-lift 541, and preferred air/fuel ratio 545 including lean 546, stoichiometric 547, and rich 548.

Initially, the engine 10 is shown operating in the HCCI combustion mode 532 with associated engine operating parameters including the lean air/fuel ratio 546 as shown, or alternatively at a stoichiometric air/fuel ratio. At time point 505, a transition to the SI combustion mode 531 is commanded. Engine operation is initially adjusted to operate in the SI combustion mode at a lean air/fuel ratio, including immediately adjusting to the SI fuel injection timing 521, immediately adjusting to the SI spark ignition timing 526, immediately adjusting the valve lift 540 to the high-lift 541. Fueling is initially maintained at the lean air/fuel ratio 546. At time point 506, the cam phasing 535 begins transitioning toward a preferred cam phasing associated with PVO 536. The air/fuel ratio is adjusted toward stoichiometric air/fuel ratio 547, preferably coincident with the transitioning of the cam phasing 535. In any event, the transition in the air/fuel ratio is executed to maintain the combustion stability at an acceptable level.

Time point 506 preferably occurs after a brief delay from the command to transition to the SI combustion mode 531 at time point 505. This delay is sufficient to coordinate the air/fuel ratio transition from lean to stoichiometric with the slower dynamic response of the cam phasing 535 transition from NVO 537 to PVO 536. At time point 507, the cam phasing control is complete, having achieved the desired PVO 536 and the coordinated air/fuel ratio control has achieved the desired stoichiometric air/fuel ratio.

Operation of the engine 10 that includes FCO may cause excess oxygen in the exhaust gas feedstream, which may be stored on the TWC 110. During a subsequent engine re-firing, engine operation may include NOx generation, which passes through the TWC 110 if the TWC 100 is oxygen-saturated. Under such operation, the passive SCR strategy 200 is used to control the engine 10 to operate at the preferred engine control scheme selected to achieve minimum fuel consumption at the engine operating point corresponding to the engine torque command. NOx breakthrough from the TWC 110 may be reduced in the SCR 120. Thus, the passive SCR strategy 200 used in conjunction with the passive-SCR exhaust aftertreatment system 100 negates a need to operate the engine 10 at a rich air/fuel ratio immediately subsequent to the engine re-firing event, thus reducing fuel consumption and correspondingly increasing fuel economy.

Figure 6:
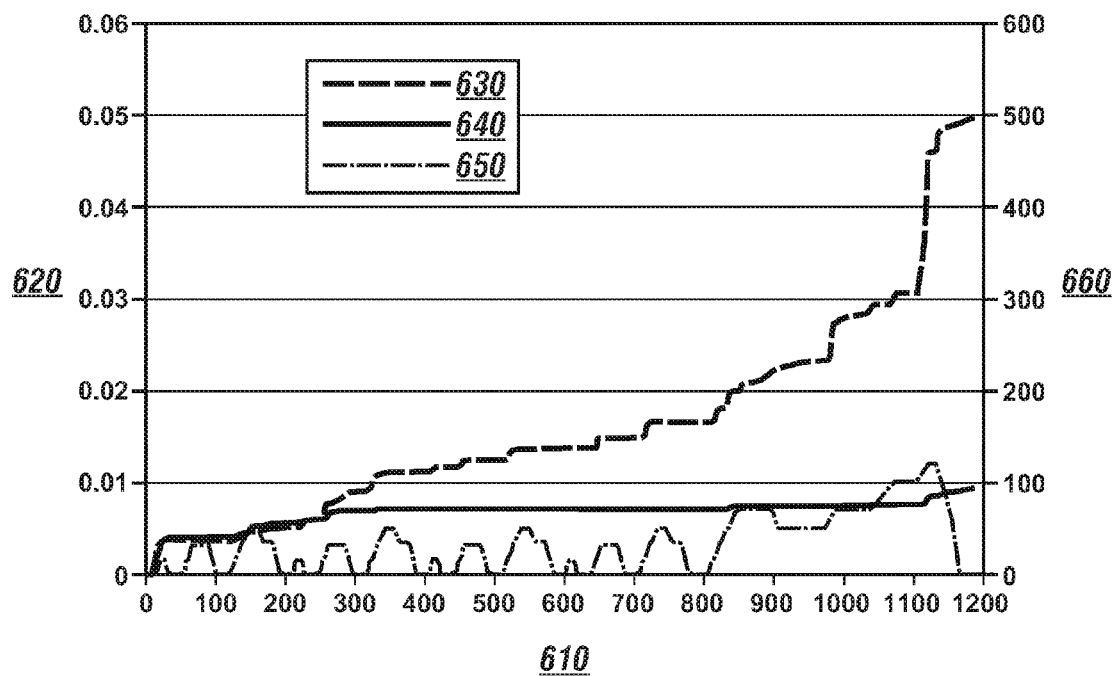
FIG. 6 graphically illustrates results associated with operation of a vehicle including an embodiment of the engine equipped with the passive-SCR exhaust aftertreatment system and implementing the passive SCR strategy in accordance with the disclosure.

FIG. 6 graphically illustrates results associated with operation of a vehicle including an embodiment of the engine 10 that is equipped with the passive-SCR exhaust aftertreatment system 100 implementing the passive SCR strategy 200. The results are graphically plotted on y-axes of cumulative NOx emissions (g/km) 620 and vehicle speed (km/h) 660 in relation to an x-axis of elapsed time 610. The depicted results include cumulative NOx emissions after the TWC 110 (630), NOx emissions after the SCR 120 (640) and vehicle speed (650) during an NEDC driving cycle. Each transition from steady state lean or stoichiometric HCCI operation to stoichiometric SI operation includes an intermediate period of operating in a lean SI combustion mode. This lean SI operation is more fuel efficient than other engine control strategies such as stoichiometric SI operation with retarded or over-advanced combustion. NOx emissions from such a combustion transition strategy may be significantly reduced by using the passive SCR exhaust aftertreatment system 100 and the passive SCR strategy 200, and thus may significantly reduce overall NOx emissions.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for transitioning a direct-injection internal combustion engine fluidly coupled to a passive SCR system including a three-way catalytic converter upstream to an ammonia-selective catalytic reduction catalyst from an HCCI combustion mode and a SI combustion mode, the method comprising:
   determining a preferred air/fuel ratio to achieve a minimum fuel consumption and maintain combustion stability at an acceptable level for a predetermined engine operating point during the SI combustion mode;
   substantially immediately controlling a fuel injection timing, an engine spark timing and an engine valve lift from respective HCCI combustion mode settings to respective SI combustion mode settings;
   only after the fuel injection timing, the engine spark timing, and the engine valve lift settings are operative at the respective SI combustion mode settings, coordinating a transition to the preferred air/fuel ratio coincident with a transition from a HCCI combustion mode engine valve phase setting to a SI combustion mode engine valve phase setting; and
   once the transition to the SI combustion mode engine valve phase setting is complete, operating the engine at the preferred air/fuel ratio.

2. The method of claim 1, further comprising determining a preferred engine fueling rate comprising a minimum engine fueling rate necessary to achieve the predetermined engine operating point at the preferred air/fuel ratio when operating in the SI combustion mode.

3. The method of claim 1, wherein said respective SI combustion mode setting of the engine spark timing comprises a mean-best torque spark timing.

4. The method of claim 1, wherein said respective SI combustion mode setting of the engine valve lift comprises a high-lift valve open position.

5. The method of claim 1, wherein said SI combustion mode engine valve phase setting comprises a positive valve overlap.

6. Method for operating a direct-injection internal combustion engine fluidly coupled to a passive SCR system including a three-way catalytic converter upstream to an ammonia-selective catalytic reduction catalyst, the method comprising:
   determining an engine torque command;
   selecting a preferred engine control scheme comprising
      a SI combustion mode, and
      a preferred air/fuel ratio to achieve a minimum fuel consumption and maintain combustion stability at an acceptable level for an engine operating point corresponding to the engine torque command;

determining a preferred engine fueling rate comprising a minimum engine fueling rate to achieve the engine operating point corresponding to the engine torque command at the preferred air/fuel ratio when employing the preferred engine control scheme; and employing a transition from a HCCI combustion mode to the preferred engine control scheme comprising the SI combustion mode to control the engine at the preferred engine fueling rate, comprising substantially immediately controlling a fuel injection timing, an engine spark timing and an engine valve lift from respective HCCI combustion mode settings to respective SI combustion mode settings, only after the fuel injection timing, the engine spark timing, and the engine valve lift settings are operative at the respective SI combustion mode settings, coordinating a transition to the preferred air fuel ratio coincident with a transition from a HCCI combustion mode engine valve phase setting to a SI combustion mode engine valve phase setting, and once the transition to the SI combustion mode engine valve phase setting is complete, operating the engine at the preferred air/fuel ratio.

7. The method of claim 6, wherein said respective SI combustion mode setting of the engine spark timing comprises a mean-best torque spark timing.

8. The method of claim 6, wherein said respective SI combustion mode setting of the engine valve lift comprises a high-lift valve open position.

9. The method of claim 6, wherein said SI combustion mode engine valve phase setting comprises a positive valve overlap.

10. The method of claim 6, wherein said engine torque command corresponds to an engine refiring event subsequent to a fuel cutoff event.

11. The method of claim 10, wherein said preferred engine fueling rate comprises a minimum engine fueling rate necessary to achieve the engine operating point corresponding to the engine torque command corresponding to the engine refiring event subsequent to the fuel cutoff event at the preferred air/fuel ratio.

12. A direct-injection internal combustion engine system, comprising:

a direct-injection internal combustion engine including a fuel injection system, a spark ignition system, a valve lift control system and a valve phase control system;

a three-way catalytic converter coupled to an exhaust gas stream from internal combustion engine upstream to an ammonia-selective catalytic reduction catalyst; and a controller configured to transition the internal combustion engine from an HCCI combustion mode to a SI combustion mode, comprising determining a preferred air/fuel ratio to achieve a minimum fuel consumption and maintain combustion stability at an acceptable level for a predetermined engine operating point during the SI combustion mode;

substantially immediately controlling a fuel injection timing, an engine spark timing and an engine valve lift from respective HCCI combustion mode settings to respective SI combustion mode settings;

only after the fuel injection timing, the engine spark timing, and the engine valve lift settings are operative at the respective SI combustion mode settings, coordinating a transition to the preferred air/fuel ratio coincident with a transition from a HCCI combustion mode engine valve phase setting to a SI combustion mode engine valve phase setting; and once the transition to the SI combustion mode engine valve phase setting is complete, operating the engine at the preferred air/fuel ratio.

\* \* \* \* \*